UNITED STATES PATENT OFFICE.

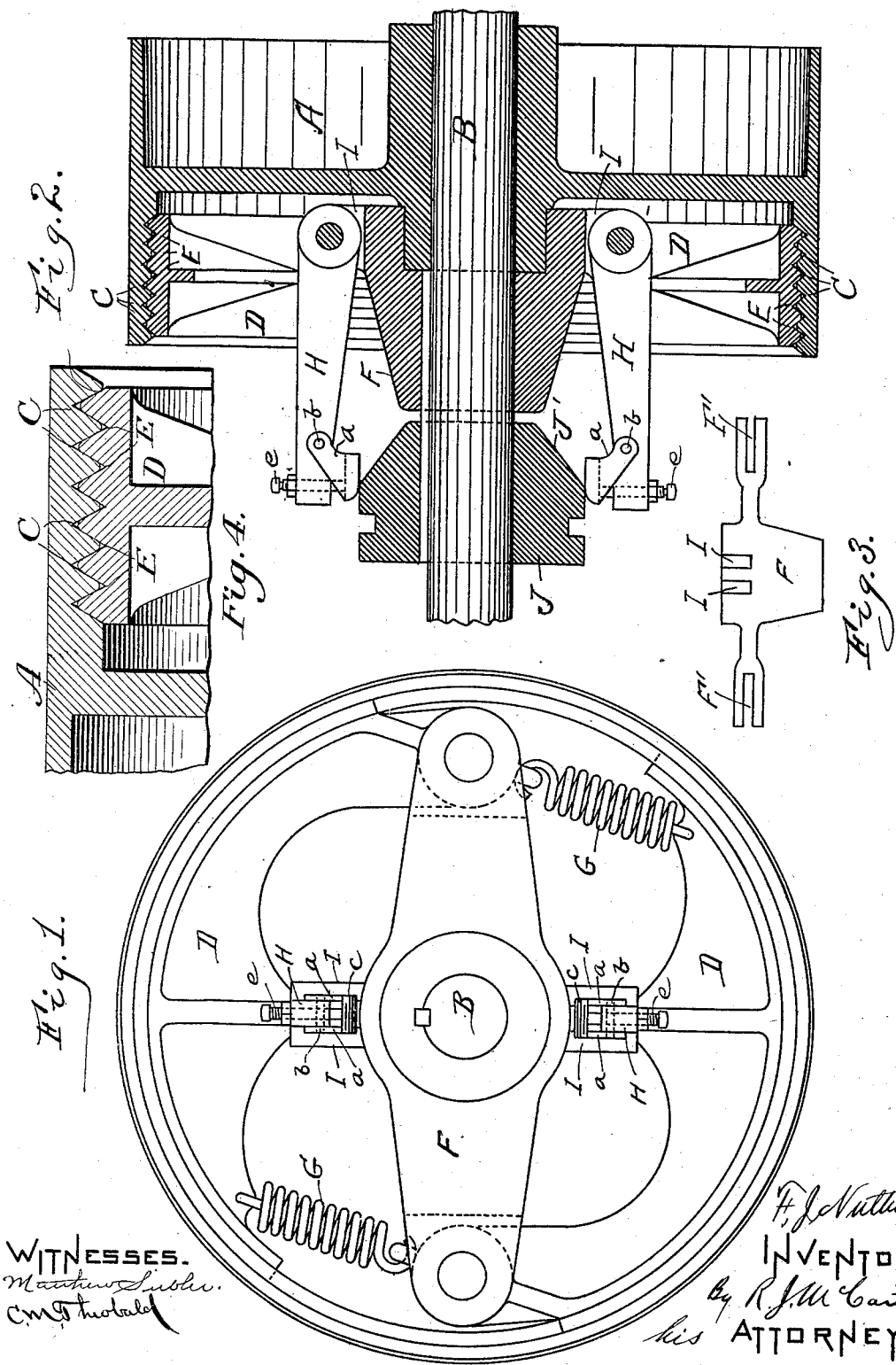

FREDERICK J. NUTTING, OF DAYTON, OHIO.

FRICTION-CLUTCH.

SPECIFICATION forming part of Letters Patent No. 722,244, dated March 10, 1903.

Application filed April 7, 1902. Serial No. 101,746. (No model.)

*To all whom it may concern:*

Be it known that I, FREDERICK J. NUTTING, a citizen of the United States, residing at Dayton, in the county of Montgomery and State of Ohio, have invented certain new and useful Improvements in Friction-Clutches; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved friction-clutch for connecting shafting with a loose-running pulley.

The object of my invention is to provide a friction-clutch which is simple in its construction, positive in its movements, and possesses a maximum amount of frictional engaging surface, all of which will be hereinafter fully set forth in the following specification.

The accompanying drawings illustrate my improved friction-clutch.

Figure 1 is a side elevation of the clutch. Fig. 2 is a vertical sectional elevation of the same. Fig. 3 is a detached view of the driving-arm. Fig. 4 is a sectional detail showing more distinctly the relative depths of the grooves and tongues on the pulley and the friction-jaw.

A designates a loose-running pulley on shaft B.

C designates a series of disconnected annular V-shaped grooves on the interior surface of the pulley and occupying approximately one-half of the interior circumference of said pulley. By thus providing the interior surface of the pulley with said V-shaped grooves a greater extent of frictional engaging surface is obtainable—in other words, a frictional engaging surface which is equivalent to over two-thirds of the width of the pulley.

D D designate two oppositely-positioned friction-jaws which have a suitable curvature to conform approximately to the shape of the pulley. The segmental area of these jaws is essentially slightly larger than the segment of the pulley with which they engage in order that a proper frictional contact between said jaws and the pulley will take place. The outer or engaging surfaces of the said jaws are provided with a series of disconnected annular V-shaped grooves E, which match with the corresponding teeth on the pulley when the jaws are moved to their engaging positions. The V-shaped grooves on both the pulley and the jaws are somewhat deeper than the engaging teeth in order that the frictional engagement between these parts may be similar to a wedge engagement. This essential structural feature, in connection with the larger segment of the jaws, will result in a most effective engagement between the jaws and the pulley when said jaws are thrown into engagement. In other words, in the construction of these matching V-shaped grooves on the interior of the pulley and on the outer surfaces of the friction-jaws in the manner above specified, in connection with the larger segment of the jaws, as compared to the segment of the pulley with which they engage, a most binding frictional contact is provided, which results in an instantaneous and lasting control of the pulley.

F designates a driver or arm keyed or otherwise rigidly secured to the shaft B within the pulley A. The inner portion of the hub of said driver or arm overlaps or incloses a portion of the hub of said pulley, as shown in Fig. 2. The ends of said arms are bifurcated, as at F', to receive the opposite ends of the friction-jaws, which have pivotal connections therewith.

G G designate coil-springs which are connected to opposite ends of the friction-jaws D and the driving-arm F and which maintain said friction-jaws when not in gear with the pulley out of contact with said pulley against centrifugal force.

H H designate levers which are fulcrumed to the hub of the driving-arm F between ears I I, projecting from opposite sides of the hub. These levers make contact with the median portions of the clutch-jaws D D and have upon their outer ends shoes $a\ a$, said shoes being attached to the forward ends of said levers by means of pivot-pins $b$, the said shoes straddling the lower side of the levers and having a transverse portion $c$.

$e\ e$ designate adjusting-screws which pass through the ends of the levers and make contact with the parts $c\ c$ of said shoes. By means of these screws $e\ e$ the position of the shoes $a\ a$ relatively to the shifting-collar J is adjusted to vary the movement of the levers H H under the action of shifting-collar J. The contact-surface of said shoes $a\ a$ engages with the tapering surface $J'$ of the shifting-collar when said collar is moved inwardly to actuate the levers H H to move outwardly the clutch-jaws D D to engage with the pulley. When the levers H H are released from the pressure due to the position of the shifting-collar J, the compression of the springs G G instantly removes the friction-jaws from contact with the pulley in a manner readily understood.

It will be understood that the friction-jaws, together with the driving-arm F, move constantly with the shaft, the pulley being loose on said shaft.

Having described my invention, I claim—

1. In a friction-clutch, the combination of a pulley having a series of annular V-shaped disconnected grooves on the interior thereof, said V-shaped grooves occupying approximately one-half of the interior surface of said pulley, friction-jaws within said pulley, each of said jaws corresponding in width to approximately one-half the width of the rim of the pulley, and the same having a corresponding series of V-shaped disconnected grooves on the outer surfaces thereof adapted to match with the grooves on the pulley, the said grooves on the pulley and the grooves on the friction-jaws being deeper than the engaging teeth, a driving-arm, operating-levers fulcrumed on said driving-arm and adapted to actuate the friction-jaws to effect a wedge-like contact with the pulley, shoes pivoted to the said operating-levers, and means for adjusting the position of said shoes relatively to the shifting-collar, substantially as specified.

2. In a friction-clutch, the combination of a pulley having a series of disconnected V-shaped grooves on the interior thereof, said V-shaped grooves occupying approximately one-half of the interior surface of said pulley, friction-jaws having a series of corresponding grooves, the width of said friction-jaws being substantially equal to one-half the width of the interior surface of said pulley, the grooves of both the clutch and the jaws being somewhat deeper than the entering teeth, a driver or arm, operating-levers carried by said driver or arm and adapted to actuate said friction-jaws to effect a wedge-like engagement between the jaws and the pulley, shoes pivoted to said levers, means for adjusting said shoes to vary the movement of the levers, and a shifting-collar to actuate said levers through said shoes, substantially as set forth.

In testimony whereof I affix my signature in presence of two witnesses.

FREDERICK J. NUTTING.

Witnesses:
R. J. McCARTY,
C. M. THEOBALD.